(12) United States Patent
Moeller et al.

(10) Patent No.: US 8,542,661 B2
(45) Date of Patent: *Sep. 24, 2013

(54) MOBILE ROUTER NETWORK SERVER METHOD WITH BILLING RECONCILIATION

(75) Inventors: Douglas S Moeller, Santa Rosa, CA (US); Ronald W Pashby, San Francisco, CA (US)

(73) Assignee: Autonet Mobile, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/431,566

(22) Filed: Mar. 27, 2012

(65) Prior Publication Data

US 2012/0208499 A1    Aug. 16, 2012

Related U.S. Application Data

(63) Continuation-in-part of application No. 12/514,049, filed as application No. PCT/US2007/011624 on May 15, 2007, now Pat. No. 8,189,552.

(60) Provisional application No. 60/800,749, filed on May 16, 2006, provisional application No. 60/800,679, filed on May 16, 2006, provisional application No. 60/800,750, filed on May 16, 2006.

(51) Int. Cl.
*H04W 4/00*    (2009.01)

(52) U.S. Cl.
USPC ........... 370/338; 455/406; 455/407; 455/408; 455/409; 379/114.01; 379/114.03; 379/114.04; 379/114.14; 379/114.28; 705/40

(58) Field of Classification Search
USPC ............ 455/406, 407, 408, 409; 379/114.01, 379/114.03, 114.04, 114.1, 114.14, 114.28, 379/114.29, 126; 705/40
See application file for complete search history.

(56) References Cited

U.S. PATENT DOCUMENTS

| 7,657,485 B2 * | 2/2010 | Daidone et al. | 705/40 |
| 2006/0104232 A1 * | 5/2006 | Gidwani | 370/328 |

* cited by examiner

*Primary Examiner* — Kamran Afshar
*Assistant Examiner* — Sayed T Zewari
(74) *Attorney, Agent, or Firm* — Donald J Lenkszus

(57) ABSTRACT

A method of operating a network server, for a network comprising a plurality of wireless mobile routers is provided. Each mobile router comprises a wide area network wireless interface to access a cellular network provided by a predetermined cellular service provider and is operable to upload and download data via the cellular network. Each mobile router is operable to monitor the uploaded and downloaded data to generate usage. The method comprises: selectively coupling the server to the plurality of mobile routers via the cellular network; receiving from each of the mobile routers the corresponding usage data; operating the server to access billing data from the service provider for each mobile router; and comparing the usage data for each mobile router to corresponding billing data for each mobile router to determine if there is a billing discrepancy.

22 Claims, 9 Drawing Sheets

MOBILE ROUTER NETWORK SERVER METHOD WITH BILLING RECONCILIATION

CROSS-REFERENCE TO RELATED APPLICATIONS

The present application is a continuation-in-part of U.S. patent application Ser. No. 12/514,049 filed as PCT Application No. PCT/US07/11624 filed on May 15, 2007 now U.S. Pat. No. 8,189,552 and claiming priority to U.S. provisional application Ser. No. 60/800,749, filed May 16, 2006, U.S. provisional application Ser. No. 60/800,679, filed May 16, 2006 and claiming priority to U.S. provisional application Ser. No. 60/800,750, filed May 16, 2006.

FIELD OF THE INVENTION

The present invention relates to a networked vehicular wireless mobile router arrangement.

BACKGROUND

The use of mobile or wireless end-user computer-type devices has increased significantly. Such mobile devices must be able to connect to a wireless network. Wireless local area networks (LANs) are often deployed inside structures such as homes, offices, public and commercial buildings. A typical wireless LAN comprises one or more wireless access points, such as a wireless router or "hot spot", which communicates wirelessly with the mobile device, and allows the mobile device to connect to a wired network or other network that is also in communication with the access point. To stay connected to such a wireless LAN, the mobile device must usually stay within wireless communication range of the access points. This constrains the effective mobility of a wireless device.

The mobility constraining problem is particularly aggravated when the mobile device is disposed within a vehicle that is in motion. The mobility constraining problem has been addressed somewhat by use of cellular networks that allow mobile devices having cellular network interfaces to communicate wireless data with such cellular networks. However, most mobile computer devices do not have cellular network interfaces.

As the use of mobile devices has expanded, the mobility of such devices has expanded to the use wireless routers in vehicles. Such routers are referred to as "mobile routers" or "mobile nodes". Mobile routers typically permit a mobile device located in a vehicle that is in motion to maintain a connection to a wide area network and thereby greatly expand the mobility of the mobile device. Mobile routers are fully operable whether the vehicle having a mobile router installed therein is in motion or stationary. The mobile router may maintain connection to the Internet as it travels across cellular networks.

Cellular carriers or service providers typically charge for data usage by a customer on the basis of the amount of data bytes uploaded and downloaded to the customer device. Frequently there may be discrepancies between the carrier's or service provider's reported data usage and the actual data usage.

It is common for billing discrepancies to be found. Generally the discrepancies are in the carrier's favor.

The various cellular carriers or service providers require that discrepancies be reported within 30 days of the bill, so being able to quickly and accurately perform billing reconciliation is very important.

It is highly desirable to provide for automatic determination of data usage, automatic determination of data usage discrepancies and automatic reporting of discrepancies.

SUMMARY

One embodiment of a mobile router comprises: a wide area network wireless interface operable to access a cellular network; first apparatus operable to upload data and to download data via the interface to the cellular network; second apparatus operable to monitor the uploaded data and the downloaded data and to generate usage data corresponding to predetermined quantifiable units corresponding to the uploaded data and the downloaded data; and the first apparatus and second apparatus cooperatively operate to automatically upload the usage data to a server for generation of usage discrepancy reports.

In accordance with one aspect of the embodiment, the first apparatus and second apparatus cooperatively operate to automatically upload the usage data to the server in accordance with a predetermined schedule; and the first apparatus uploads the usage data to the server via the cellular network.

In accordance with another aspect of the mobile router embodiment, the first apparatus and second apparatus are cooperatively operable such that if, during upload of usage data to the server, the upload is interrupted, the usage data is uploaded at a subsequent time.

Another embodiment of a mobile router comprises: a wide area network wireless interface to access a cellular network provided by a predetermined cellular service provider; a local area network wireless interface for wireless connection to a mobile device; first apparatus operable to upload data from the mobile device and to download data to the mobile device via the interface and the cellular network; second apparatus operable to monitor the uploaded data and the downloaded data and to generate corresponding usage data; and the first apparatus and second apparatus cooperatively operate to automatically upload the usage data to a server.

In a further embodiment, a mobile router, comprises: a wide area network wireless interface to access a cellular network provided by a cellular service provider to upload data and to download data via the cellular network; apparatus operable to monitor the uploaded data and the downloaded data to generate corresponding usage data representative of the quantity of uploaded data and downloaded data; and the apparatus is automatically operable to upload usage data to a server for comparison with billing data obtained from the service provider to generate usage discrepancy reports.

The further embodiment of a mobile router may comprise a memory, and the apparatus is operable to store the usage data in the memory.

A yet further embodiment of a mobile router comprises: a wide area network wireless interface operable to access a cellular network, usage of the cellular network is billed based upon data usage; a communications agent operable to upload data and to download data to the cellular network via the interface; a processor operable to monitor the uploaded data and the downloaded data and to generate usage data corresponding to predetermined quantifiable units corresponding to the uploaded data and the downloaded data; and the communications agent and the processor cooperatively operate to automatically upload the usage data to a server for generation of usage discrepancy reports.

One embodiment of a mobile router comprises: a wide area network wireless interface to access a cellular network provided by a cellular service provider to upload data and to download data via the cellular network; and a processor operable to monitor the uploaded data and the downloaded data to generate corresponding usage data representative of the quantity of uploaded data and downloaded data. The processor is automatically operable to upload the usage data to a server for comparison with billing data obtained from the service provider to generate usage discrepancy reports.

In one embodiment, a network operations center is operable with a network comprising a plurality of wireless mobile routers, each of the mobile routers comprising a wide area network wireless interface to access a cellular network provided by a predetermined cellular service provider. Each mobile router is operable to upload data and to download data via the cellular network. Each mobile router is operable to monitor the uploaded data and the downloaded data and to generate usage data of a type that the corresponding cellular service provider utilizes to bill for usage of the cellular network. The network operations center comprises: first apparatus operable to manage communications with the plurality of mobile routers, operable to receive the usage data, and operable to access billing data from the predetermined cellular service provider for each of the mobile routers; and second apparatus processor operable to compare the usage data for each mobile router to corresponding billing data to determine if there is a billing discrepancy.

In one embodiment, the network operations center further comprises: a stored predetermined discrepancy limit; and the second apparatus is operable to determine if any of the billing discrepancies exceed the predetermined limit. The second apparatus is operable to automatically generate a discrepancy report to the service provider based on the billing discrepancies.

In one embodiment the first apparatus and the second apparatus are cooperatively operable to automatically provide the report to the service provider.

In one embodiment the second apparatus is operable to sort the billing discrepancies by the amount of discrepancy and generate a report based on the billing discrepancies, and automatically provide the report to the service provider.

A network server is provided in one embodiment. The network server is operable with a plurality of wireless mobile routers. Each of the mobile routers comprises a wide area network wireless interface to access a cellular network provided by a carrier. Each mobile router is operable to upload data and to download data via the cellular network. Each mobile router is operable to monitor the uploaded data and the downloaded data and to generate statistical data in quantifiable units of a type that the corresponding carrier utilizes to bill for usage of the carrier's cellular network. The network server comprises: a communications manager operable to manage communications with the plurality of mobile routers, operable to receive the statistical data and operable to access billing data from the predetermined carrier for each of the mobile routers; and a processor operable to compare the statistical data for each wireless mobile router to corresponding billing data to determine if there is a billing discrepancy.

In an embodiment, the network server may comprise a stored predetermined discrepancy limit. The processor is operable to determine if any of the billing discrepancies exceed the predetermined limit and is operable to automatically generate a discrepancy report to the carrier based on the billing discrepancies.

In an embodiment, the communications manager and the processor are cooperatively operable to automatically provide the discrepancy report to the carrier.

In one embodiment, the processor is operable to sort the billing discrepancies by the amount of discrepancy.

In the various embodiments, the billing data is for a predetermined billing period.

In one embodiment, a method of operating a network server for a network comprising a plurality of wireless mobile routers is provided. Each mobile router comprises a wide area network wireless interface to access a cellular network provided by a predetermined cellular carrier or service provider. Each mobile router is operable to upload data and to download data via the cellular network and is operable to monitor the uploaded data and the downloaded data and to generate statistical data in quantifiable units of a type that the corresponding cellular carrier utilizes to bill for usage of the carrier's cellular network. The method comprises: selectively coupling the server to the plurality of mobile routers via the cellular network; operating the server to access billing data from the predetermined carrier for each of the mobile routers; receiving from each of the mobile routers the corresponding statistical data; comparing the statistical data for each mobile router to corresponding billing data for each mobile router to determine if there is a billing discrepancy.

The method further comprises determining if the billing discrepancy exceeds a predetermined limit.

In accordance with one aspect of the embodiment, the method comprises automatically generating a discrepancy report to the carrier or service provider.

In accordance with yet another aspect of the embodiment, the method comprises receiving the statistical data from each mobile router in accordance with a predetermined schedule. The method further may comprise the server receiving the statistical data via the cellular network.

In accordance with still yet a further aspect of the embodiment, the method may comprise one or more of the following steps of storing a predetermined discrepancy limit; determining if the billing discrepancies for any of the mobile routers exceeds the predetermined limit; storing the billing discrepancies for each mobile router; generating a report based on the billing discrepancies; and automatically providing the report to the carrier.

The method embodiment may comprise the steps of sorting the billing discrepancies by the amount of discrepancy; and generating a report based on the billing discrepancies; and automatically providing the report to the carrier.

In accordance with various embodiments, the billing data is for a predetermined billing period.

In one embodiment, a network, comprises: a plurality of wireless mobile routers, each comprising a wide area network wireless interface to access a cellular network provided by a predetermined cellular carrier. Each mobile router is operable to upload data and to download data via the cellular network. Each mobile router is operable to monitor the uploaded data and the downloaded data and to generate statistical data in quantifiable units of a type that the corresponding cellular carrier utilizes to bill for usage of the carrier's cellular network. The network further comprises a server coupleable to the plurality of wireless mobile routers via the cellular network. The server is operable to access billing data from the predetermined carrier for each of the mobile routers. Each of the mobile routers automatically operates to upload the statistical data to the server. The server operates to compare the statistical data for each mobile router to corresponding billing data for each mobile router to determine if there is a billing discrepancy.

The server may operate to determine if the billing discrepancy exceeds a predetermined limit. The server may be operable to automatically generate a discrepancy report to the carrier.

In one network embodiment, the mobile router uploads the statistical data to the server in accordance with a predetermined schedule and via the cellular network.

In a network embodiment, the mobile router is operable such that if, during an upload of the statistical data to the server, the upload is interrupted, the mobile router retains the statistical data, and uploads the statistical data during a subsequent time that the mobile router has a communications link to the server.

In a network embodiment, the server comprises a stored predetermined discrepancy limit. The server operates to determine if the billing discrepancies for any of the mobile routers exceeds the predetermined limit. The server may be operable to store the billing discrepancies for each mobile router. The server is operable to generate a report based on the billing discrepancies. The server automatically provides the report to the carrier. The server may be operable to sort the billing discrepancies by the amount of discrepancy.

BRIEF DESCRIPTION OF THE DRAWING

The invention will be better understood by reading the following detailed description in conjunction with the drawing figures in which like designators refer to like elements, and in which.

DETAILED DESCRIPTION

Figure 1:
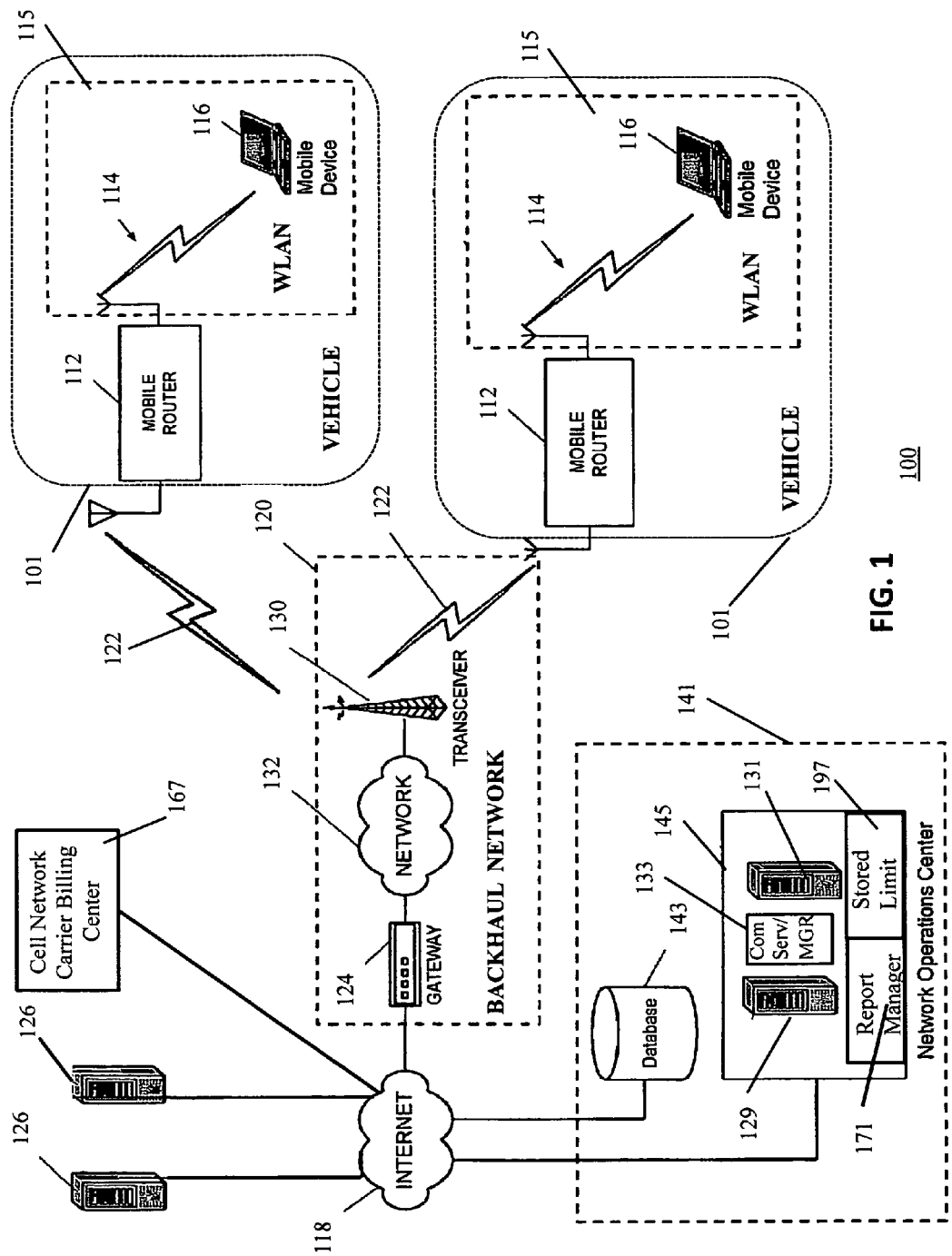
FIG. 1 is a block diagram of a first mobile router network arrangement.

FIG. 1 is a diagram of a mobile router network 100. Mobile router network 100 comprises a plurality of vehicles 101, each having therein a mobile router 112. Each vehicle 101 includes a wireless local area network 115. Each wireless local area network 115 may be in communication with one or more corresponding mobile devices 116 via a wireless communication link 114. Each wireless local area network 115 includes mobile router 112 and may or may not include one or more mobile devices 116. Each wireless local area network 115 may be, for example, a network compliant with industry standard IEEE 802.11 network, i.e., a Wi-Fi network, or a network compliant with industry standard IEEE 802.16, i.e., a WiMAX network, or a Bluetooth network, or any other suitable wireless network.

Each mobile device 116 may be any processor based device having a wireless transceiver capable of receiving and transmitting data via the wireless communication link 114. For example, one mobile device 116 may be a laptop (or notebook) computer equipped with a wireless network interface card, a wireless-enabled PDA, a pocket or palmtop computer, a Wi-Fi phone (e.g., a Skype phone or VoIP phone), a Wi-Fi appliance, a Sony PlayStation PSP or some other portable, network-enabled gaming station, a video screen, a digital camera, an audio player, a navigation device, a security camera, an alarm device, a wireless payment or POS device, or an automotive electronic device.

Mobile router 112 may act as a gateway between wireless network 115 and a backhaul network 20. In one embodiment, backhaul network 120 is a cellular wireless network. Backhaul network 120 in turn may be connected to the Internet 118 or any other network, such as an intranet or another WAN, via a gateway 24.

Mobile router 112 communicates with the backhaul network 120 via a backhaul wireless communication link 122. Backhaul wireless communication link 122 may be provided by a wireless network that is part of the backhaul network 120, such as a cellular wireless network. The cellular wireless network may be of any type.

Examples of such types of cellular network, include but are not limited to the following types: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Each mobile router 112 and its corresponding mobile device 116 are co-located in a vehicle 101 so that mobile router 112 is capable of being mobile and operable to establish connectivity whether mobile or stationary such that each end-user of a mobile device 116 can enjoy wireless connectivity to Internet 118 via mobile router 112 as the vehicle travels through cells or nodes associated with wireless network 122. Vehicle 101 may be any type of vehicle that travels over and/or under land, over and/or under water, or in the air or space. The typical most common type of vehicle 101 that is likely to include a mobile router is a car, truck, or bus.

Each mobile router 112 may be mounted in a corresponding vehicle 101 in a secure and generally tamper-resistant location. For example, the mobile router 112 may be mounted in the trunk of an automobile, and the end-user of the mobile device 116 may be a passenger or driver of the automobile. That way, the end-user could enjoy wireless connectivity as the automobile moves between cells of the wireless network 122.

Although only one mobile device 116 is shown in communication with each mobile router 112 shown in FIG. 1, numerous mobile devices 116 may be in communication with a corresponding mobile router 112 via the corresponding local area network 115.

Cellular network cell site transceiver 130 may be used to provide a cellular link to mobile router 112 and both receive and transmit wireless signals to a mobile router 112 via one of the wireless cellular communication links 122. A cellular communication network 132 of cellular backhaul network 120 may communicate via the worldwide web or Internet 118 or another network via one or more gateways 124. Each communication network 132 may include conventional communication network elements to provide wireless cellular network service for each mobile router 112.

Figure 2:
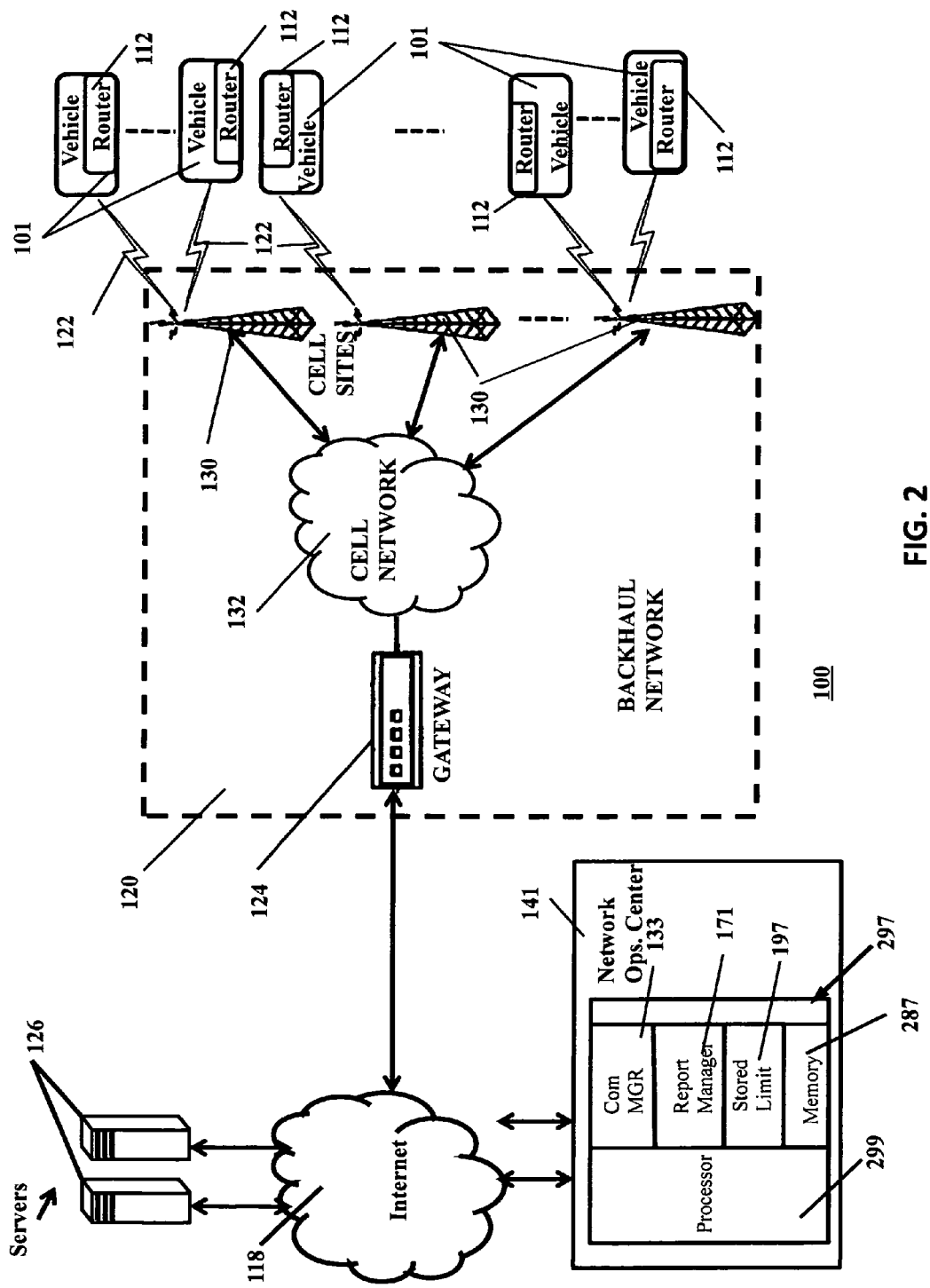
FIG. 2 is a block diagram of an expanded mobile router network arrangement.

Turning now to FIG. 2, mobile router network 100 is shown in a more expanded networked arrangement in which cellular backhaul network 120 is shown as having a plurality of cell site transceivers 130, each of which can communicate with one or more vehicles 101 having a mobile router 112 therein. FIG. 2 shows one gateway 124 to Internet 118, but it will be appreciated that there may be a plurality of such gateways 124, each of which may have access to the Internet 118 or to another network.

Figure 3:
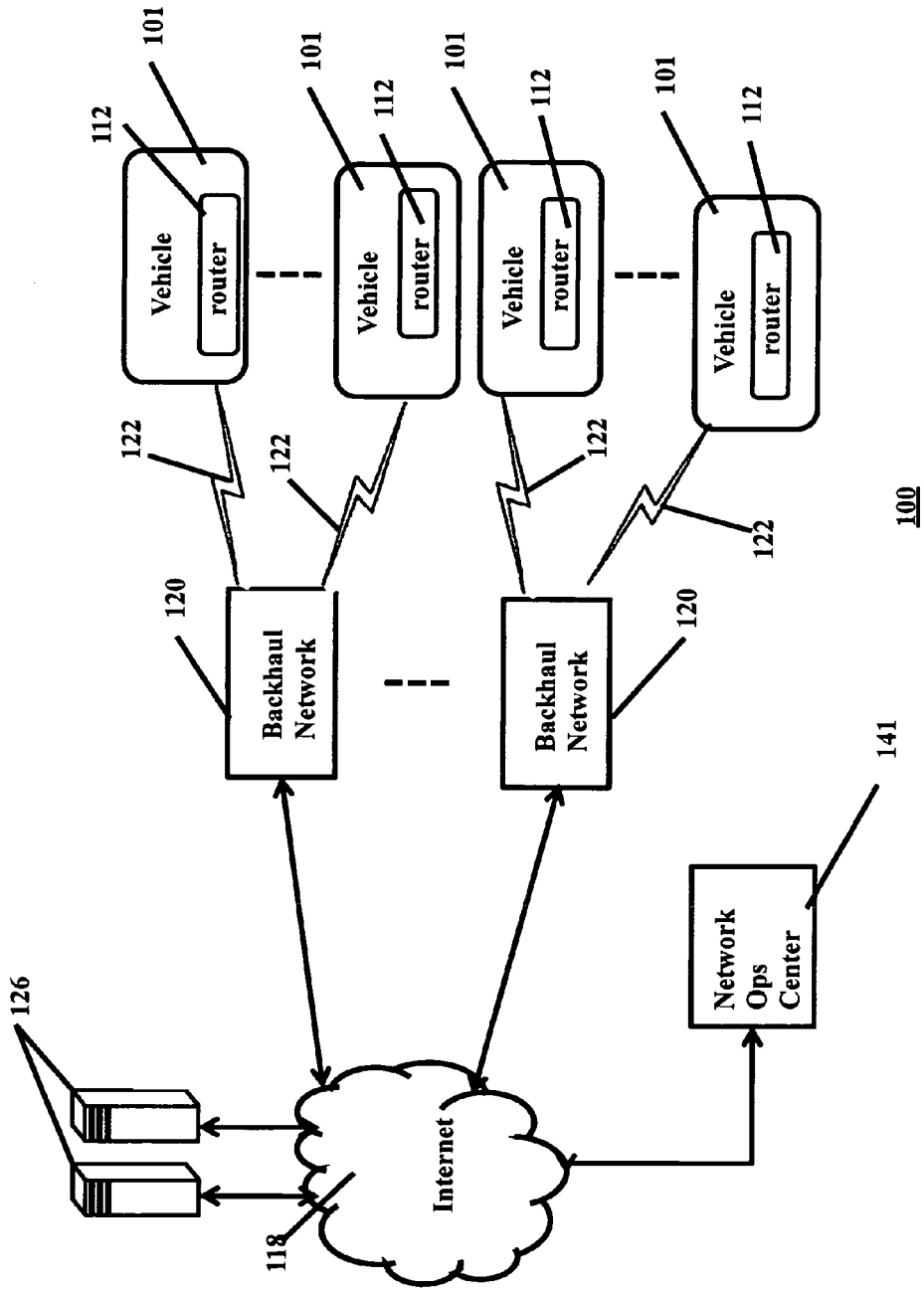
FIG. 3 is a block diagram of a further expanded mobile router network arrangement.

Turning now to FIG. 3, mobile router network 100 is illustrated in further expanded form to show that in which there may be a plurality of cellular backhaul networks 120 each comprising a number of cell site transceivers, each located in different areas serviced by the backhaul networks 120, such that each mobile router 112 may stay in communication with a backhaul network 120 as each mobile router 112 moves between cells or nodes of the backhaul networks 120. It will be appreciated by those skilled in the art, that there is virtually no limit to the size of mobile router network 100.

Each of FIGS. 1 through 3 shows that mobile router network 110 comprises at least one network operations center 141. Network operations center 141 comprises a database 143 and a network management system 145. Network management system 145 is a combination of hardware and software used to monitor and administer or otherwise manage mobile router network 100. Each mobile router 112 is managed as an individual network element.

Network management system 145, comprises an authentication server 129, a session manager 131, and a communication server 133. Communication server 133 is a combination of hardware and software used to manage communications between mobile routers 120, and network management system 145.

Figure 4:
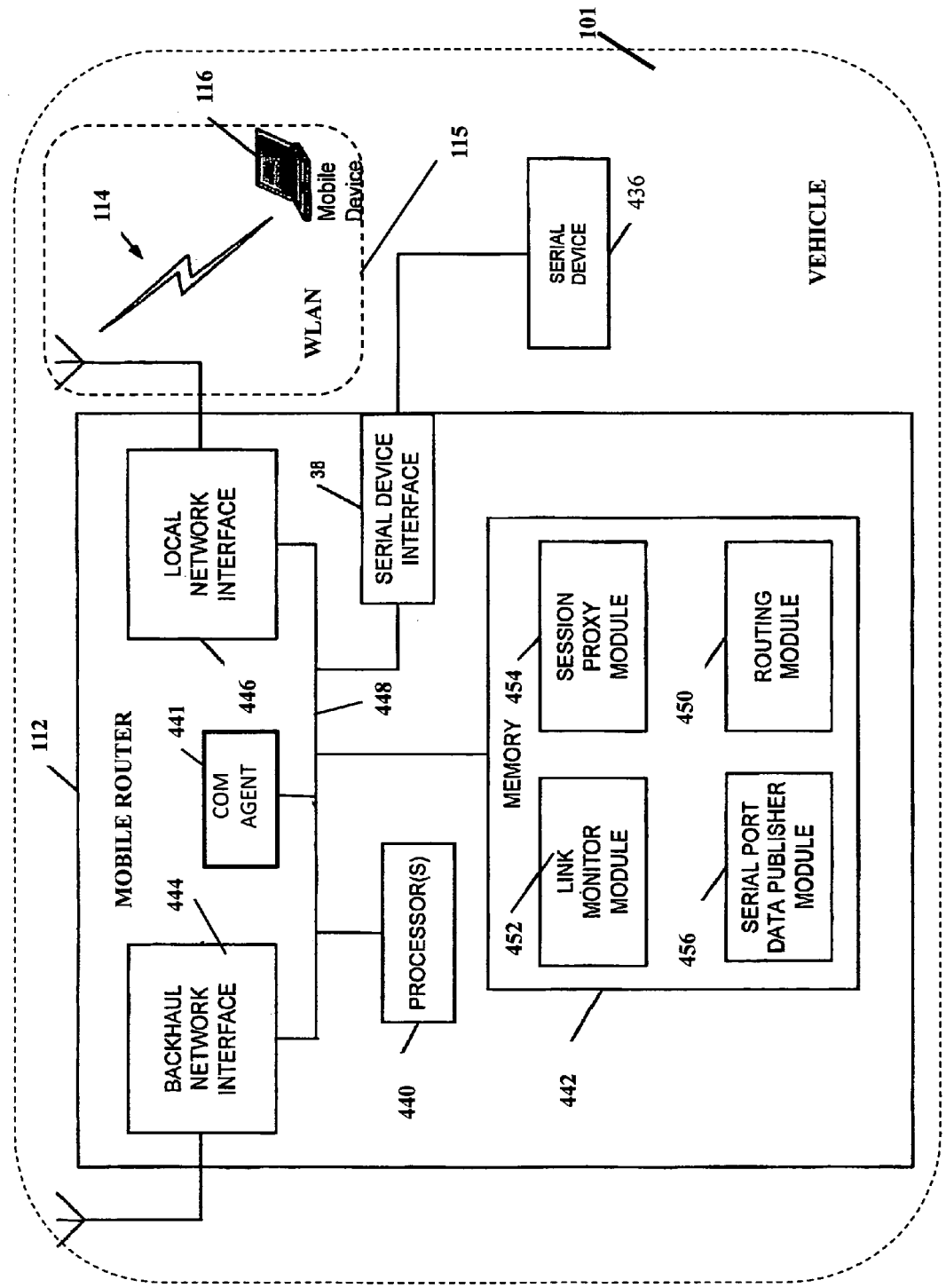
FIG. 4 is a block diagram of a mobile router.

FIG. 4 is a simplified block diagram of a mobile router 112 situated in a vehicle 101. Mobile router 112 comprises processor 440, one or more memory units 442, a backhaul network interface or wide area network interface or cellular network interface 444, and a local network interface 446. A system bus 448 interconnects processor 440, memory units 442, backhaul network interface 444 and local network interface 446.

Backhaul or cellular network interface 444 interfaces with and provides a wireless communication link with backhaul or cellular network 120 via cell site transceiver 130. Backhaul or cellular network interface 444 may interface with one or more types of wireless cellular communication links 122. For example, the backhaul cellular network interface 444 may interface to any one or more of: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Local network interface 446 interfaces and provides a wireless communication link 114 with wireless local area network 115. Similarly, local network interface 446 may interface to one or more types of wireless network links 114 such as a Wi-Fi, WiMAX, or Bluetooth link.

Processor 440 may execute various programs or instruction code stored in memory 442. Memory 442 may comprise one or more types of computer-readable media. As such, memory 442 may comprise one or more memory chips, optical memory devices, magnetic memory devices, or other memory devices.

Various programs or program modules are executable by processor 440. The program modules include a routing module 450, a link monitor module 452, a session proxy module 454, and a serial port data publisher module 456. The program modules 450, 452, 454, 456 may be stored in portions of memory 442 or in one or move separate memories.

Routing module 450 is executed by processor 440 to route data packets between wireless network 415 and backhaul or cellular network 420. Link monitor program 452 monitors cellular communication links 122 (layer 2) and also Internet communication links (layer 3) via backhaul or cellular network 120 by sending test or probing data packets and monitoring for responses thereto. By monitoring the sending and receiving of test packets and responses, processor 440 executing link monitor program 452 detects if either (or both) of cellular communication link or Internet 118 link fails.

When processor 440, executing link monitor module 52, detects a drop-off, the dropped link is automatically reestablished to minimize the interruption in service to the end user.

In many prior art mobile routers, when communications links are lost, the end-user's applications and network sessions are terminated. The end-user has to restart the applications and/or session when the communications links and network connection are reestablished.

When processor 440 detects a failure in one or both of the communications link 122 or Internet 118 link, processor 440 initiates remedial action by attempting to reestablish the link or links. Processor 440 may reestablish the link before any applications on the corresponding mobile device 116 have to be restarted. That way, the user does not have to restart the applications or sessions. The user just typically notices that the applications/sessions slowed for a brief period of time while the connection was being reestablished.

Link monitor module 452 as executed on processor 440 provides adaptive programming. If backhaul or cellular network interface 44 receives data packets over backhaul wireless communication link 122, processor 440 sends fewer probing test data packets. Conversely, if backhaul or cellular network interface 444 does not receive data packets, processor 440 sends more probing test data packets. By monitoring data packets received via backhaul or cellular network interface 444, processor 440 determines that the interface is functioning. Accordingly, processor 440 sends data test packets less frequently.

Processor 440, executing link monitor module 452, monitors backhaul network interface 444 to determine that data packets are received. If processor 440 determines that backhaul wireless communication link 122 is working, then processor 440 sends fewer active probes on the backhaul or cellular network 120.

Processor 440, by executing session proxy module 454 acts as a session proxy for all TCP sessions going through mobile router 112. When a mobile device 116 seeks to establish a TCP session with a destination such as a third party server 126 coupled to Internet 118, 440 terminates the TCP session coming from mobile device 116 and, instead, establishes a TCP session via backhaul network interface 444 with the destination. Mobile router 112 also maintains a separate TCP session with mobile device 116 via local wireless communication link 114.

All end-user traffic between mobile device 116 and the destination is transparently routed through mobile router 112 during the two separate sessions. If one session such as the backhaul wireless communication link 122 goes down that does not negatively affect the session between the mobile router 112 and mobile device 116. As a result, processor 440, executing session proxy program module 454, maintains a TCP session to mobile device 116. If applications running on mobile device 116 are dependent upon a TCP session, the applications may continue to run because there is a TCP session with the mobile router 112, even though the TCP session over the backhaul or cellular wireless communication link 122 is lost. When communications via backhaul or cellular communication link 122 are reestablished, mobile device 116 is able to keep running its applications and session without having to restart the applications.

When communication over backhaul network or cellular communication link 122 is interrupted, processor 440, executing session proxy program module 454, prevents the TCP session for wireless communication link 114 to mobile device 116 from starting its back-off timers. Under TCP protocol, mobile device 116 would normally assume that it cannot forward packets because of network congestion and it would accordingly start to slow down the session. In contrast, processor 440 executing session proxy module 454, maintains a TCP session between mobile router 112 and mobile device 116. Mobile 116 device does not assume that network congestion is a problem and the TCP session between mobile router 112 and mobile device 116 does not slow down.

Execution of session proxy module 454 by processor 440 may be disabled by mobile device via a control panel for mobile router 112 displayed on mobile device 116. A user can disable execution of session proxy program module 454 when the user wants to maintain a TCP session with the destination.

Processor 440 when executing serial port data publisher module 456 makes data received from a serial device 436 connected to a serial port 438 available via mobile router 112 as a TCP stream or as some other type of data stream, such as HS-TCP or SCPS data stream. A remote database 125, as shown in FIG. 1 may be populated with the data from device 436 via backhaul or cellular network 120 and Internet 118 so that data from serial device 436 can be remotely accessed via the Internet 118.

Serial device 436 may communicate with mobile router 112 using any suitable serial data protocol, including the USB (Universal Serial Bus) standard, the RS-232 standard, the RS-485 standard, or the IEEE 1394 (FireWire) standard, for example.

Serial device 436 may be any suitable type of serial device, such as, for example, a GPS receiver. Other types of serial data devices 436 may be used. Serial device 436 may be a vehicle telematics device that captures data regarding the performance and operation of the vehicle (e.g., diagnostic data) in which the device is installed. Serial device 436 may be a point-of-sale (POS) device that captures sale or payment information.

Serial data device 436 may also be a remote control for an in-car entertainment system that enables downloading music, video, games, etc., to third party systems or a device for interfacing to communication systems.

Rather than transmitting the data to a central server, e.g., database 125 shown in FIG. 1, a remote user could access mobile router 112 to access the data from serial device 436 directly. In one embodiment, an authenticated remote user could access an authentication server 123 as shown in FIG. 1 to determine the address of a specific one mobile router 112. The remote user could then use that address to communicate with mobile router 112 directly. Similarly, a local end-user of the mobile router 112 could access the data from the serial device via the local wireless network 114.

Processor 440 can output data and command signals via serial interface 438 to serial device 436. Utilizing serial interface 438, processor 440 may activate and control various components and/or systems of a vehicle 101. Serial device 436 may be able to shut of the vehicle engine, unlock the doors, activate alarm functions, etc. Serial device 436 may also, according to various embodiments, perform payment functions, download data, receive advertising, entertainment, gaming, and/or information, as well as perform network management and control.

Each mobile router 112 includes a communication agent 441. Communication agent 441, in the embodiment shown, is a program executed by processor 440, but in other embodiments, communication agent 441 may be a separate processor and program. Communication agent 441 cooperatively operates with communication server 133 shown in FIG. 1.

Processor 440 of each mobile router 112 has the ability to run applications that can perform functions and collect data independently of whether or not mobile router 112 is linked to network management system 120.

Each mobile router has associated with it a specific identifier that is maintained in database 145. The specific identifier can be any unique identifier such as a router serial number or a vehicle identification number. Network operations center 141, utilizing communication server 133, is capable of selectively communicating with each mobile router 112.

Advantageously, the selective communication between each mobile router 112 and network operation center 141 permits the downloading of application programs 565 to each of mobile routers 112 for storage in memory 442 on a selective basis, the communication of data obtained from each router 112 as a consequence of execution of a downloaded application program, and/or the communication of statistical information obtained in or by a mobile router as a result of execution of an application program.

In addition, network operation center 141 is operable to facilitate the downloading of application programs ordered by each mobile router 112 directly or indirectly from third party servers 126.

Network operations center 145 also sends predetermined commands to specific predetermined specific mobile routers 112 for immediate execution or for execution at a predetermined specified interval.

Figure 5:
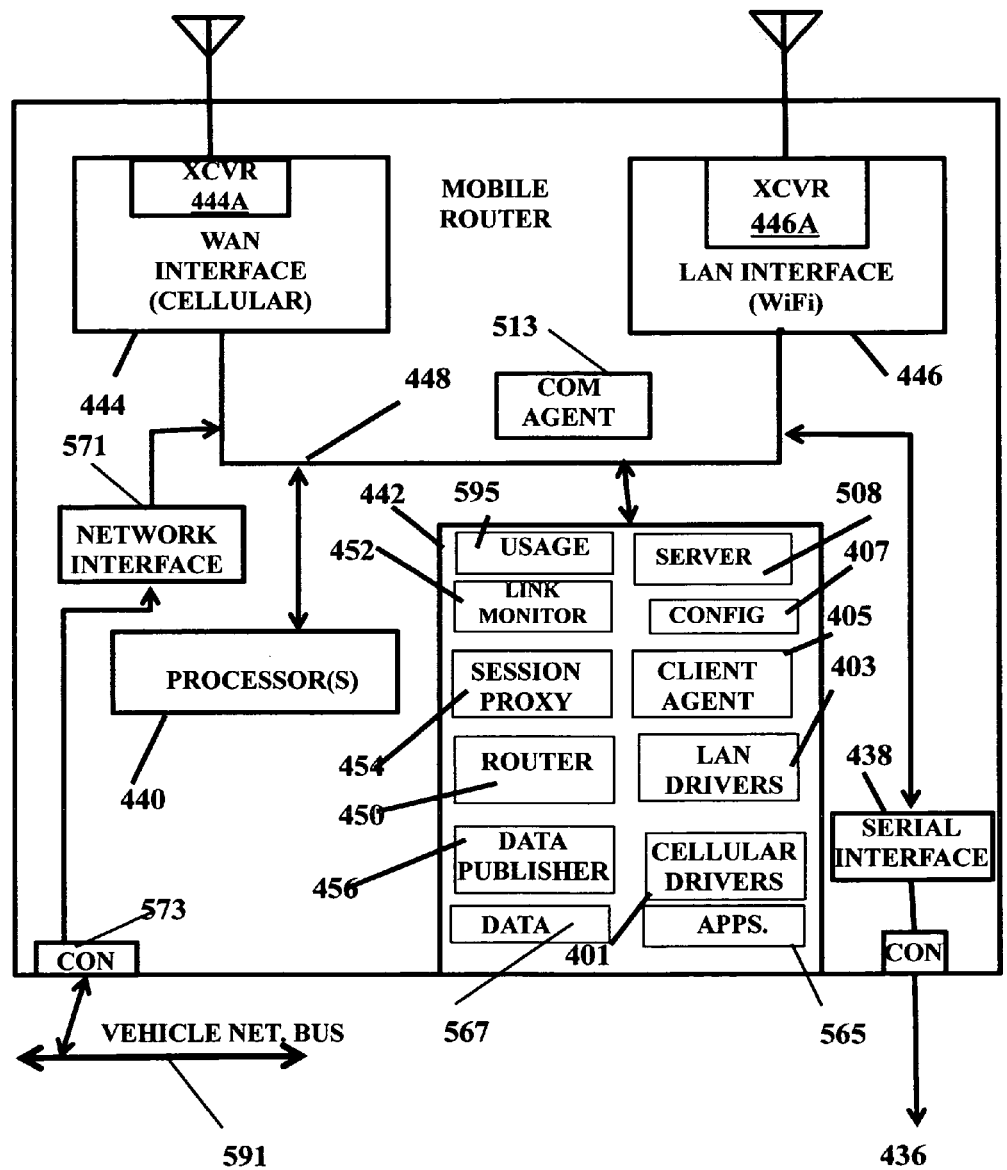
FIG. 5 is a more detailed block diagram of the mobile router of FIG. 4.

As shown in FIG. 5 each mobile router 112 stores application programs in memory 565. Each mobile router 112 is operable to collect data utilizing application programs 565 as well as from interfaces to the vehicle in which mobile router 12 is installed and/or from peripherals 430 coupled to mobile router 112 via serial data interface 438 and/or from mobile device 16. The collected data is marked with a timestamp and stored in memory 442 of mobile router 112. Depending on the nature of the data, mobile router 112 may process the data and prepare the resulting processed data for upload or mobile router 112 may prepare the data immediately for upload to network management system 120. In accordance with one embodiment, the data may be provided by a telematics device or devices.

In certain embodiments, each vehicle 101 includes a vehicle network bus 591 that typically utilizes a standardized protocol over which data or commands may be communicated with various sensors, nodes, processors and other vehicular apparatus coupled to the vehicle network bus.

Vehicle network bus 591 is a specialized internal communications network that interconnects components inside a vehicle (e.g. automobile, bus, train, industrial or agricultural vehicle, ship, or aircraft). Special requirements for vehicle control such as assurance of message delivery, assured non-conflicting messages, assured time of delivery as well as low cost, EMF noise resilience, redundant routing and other characteristics are met with the use of various standardized networking protocols.

Standardized vehicle network bus protocols include Controller Area Network (CAN), Local Interconnect Network (LIN) and others.

Vehicle network bus 591 provides access to the various vehicle electronic control modules in the vehicle. Some of the typical electronic modules on today's vehicles are the Engine Control Unit (ECU), the Transmission Control Unit (TCU), the Anti-lock Braking System (ABS) and body control modules (BCM).

A vehicle electronic control module typically gets its input from sensors (speed, temperature, pressure, etc.) that it uses in its computation. Various actuators are used to enforce the actions determined by the module (turn the cooling fan on, change gear, etc.). The electronic control modules need to exchange data among themselves during the normal operation of the vehicle. For example, the engine needs to tell the transmission what the engine speed is, and the transmission needs to tell other modules when a gear shift occurs. This need to exchange data quickly and reliably led to the development of vehicle network bus 591. Vehicle network bus 591 is the medium of data exchange.

Vehicle network bus 591 is utilized to create a central network in the vehicle 101. Each electronic control modules is 'plugged' into the network and can communicate with any other electronic control module installed on the network via vehicle network bus 591. Each electronic control module controls specific components related to its function and communicates with the other modules as necessary, using a standard protocol, over the vehicle network bus 591.

In addition, vehicle network bus 591 may utilize any one of a number of physical transmission media, including, but not limited to: single wire, twisted pair, and fiber optic.

Each mobile router 112 includes a vehicle network bus interface 571 and a connector 573 that connects to the vehicle network bus 591 of vehicle 101.

In one embodiment, a vehicle 101 comprises a vehicle network bus 591 and a mobile router 112. Mobile router 112 comprises a local area network interface 446 comprising a first wireless transceiver 446A of a first predetermined type to provide a link 114 to first a local area network 114 and a wide area network interface 444 comprising a second wireless transceiver 444A of a second predetermined type to provide a link 122 to a wide area network 122. The embodiment further comprises processor 440 to control operation of the local area network interface 446 and the wide area network interface 444. One of the wide area network interface 444 and the local area network interface 446 is selectively operable to establish a wireless communication link with network management system 141 comprising a communication server 133. Each mobile router 112 further comprises a communication agent 513, and an application 565 executable by the 440 to selectively acquire predetermined data from the vehicle network bus 591. Communication agent 513 is operable to upload the predetermined data obtained from vehicle network bus 591 to network management system 141 of FIGS. 1, 2, 3.

Processor 440 is operable to acquire the predetermined data during time periods that wide area network interface 444 is not communicating with network management system 141. Communication agent 513 is operable to upload the predetermined data to network management system 141 upon occurrence of a predetermined event.

The predetermined event may comprise a predetermined time period that may be the time wide area network interface 444 is in communication with network management system 141 and/or the predetermined event is determined by the predetermined data, such as, for example, data that indicates deployment of an air bag.

Mobile router 112 stores the predetermined data in memory 567.

Processor 440 provides a time stamp for the predetermined data at the time the predetermined acquired data is acquired. The time stamp is stored in memory 567 in association with the corresponding predetermined data.

Processor 440 is operable to assign a priority for the predetermined data; and is operable to execute a predetermined action to take with the predetermined data.

Processor 440 is operable to initiate immediate upload of the predetermined data to network management system 141 of the predetermined data having a predetermined one assigned priority. By way of non-limiting example, data indicating deployment of air bags would be assigned a priority for immediate upload.

Processor 440 is operable to control upload of predetermined data having a first predetermined one assigned priority at a first data rate. Processor 440 is operable to control upload of second predetermined data having a predetermined second assigned priority at a second predetermined data rate, the second predetermined data rate being slower than the first predetermined data rate.

Communication agent 513 is operable to determine if uploading of the predetermined data is interrupted. Communication agent 513 is operable in cooperation with the communication server 133 to restore uploading of the predetermined data to network management system 141 from the point of interruption when a communication link between the network management system 141 communication server 133 and the communication agent 513 is restored.

Processor 440 is operable to process the predetermined data prior to the data being uploaded; and processor 440 is operable to store the processed predetermined data as the predetermined data in memory 567.

A time stamp is generated for the predetermined data when it is acquired. The time stamp is stored in memory 567 in association with the corresponding processed predetermined data.

Communication agent 513 may be further operable to determine when uploading occurs in cooperation with the application program or programs 565.

The predetermined data may comprise statistical data and/ or diagnostic data. The diagnostic data is obtained via the vehicle network bus interface 571. Processor 440 is operable to process the diagnostic data to generate message data. Communication agent 513 is operable to upload the message data to network management system 141 via one of the local area network interface 446 and the wide area network interface 444.

In various embodiments, the application or applications 565 is or are downloaded to the vehicle via one of the wide area network interface 444 and the local area network interface 446.

It will be appreciated by those skilled in the art that the various functions of each of the plurality of mobile routers 112 may be integrated directly into a vehicle 101. In such an application of the principles of the invention, a vehicle 101 may comprise a vehicle network bus 591; a local area network interface 546 comprising a first wireless transceiver 546A of a first predetermined type to provide a link 114 to first a local area network 115; a wide area network interface 444 comprising a second wireless transceiver 444A of a second predetermined type to provide a link 122 to a wide area network 120; processor 140 to control operation of the local area network interface 446 and the wide area network interface 444. At least one of the wide area network interface 446 and the local area network interface 444 is selectively operable to establish a wireless communication link with a network management system 141 comprising a communication server 133. Vehicle 101 further comprises a communication agent 441 and one or more applications 565 executable by processor 140 to selectively acquire predetermined data from the vehicle network bus 591. Communication agent 513 is operable to upload the predetermined data to network management system 141.

Data for uploading can be prioritized and rate limited by processor 140. By way of non-limiting example, if the data has a high priority, such as an indication of airbag deployment then the data is immediately prioritized over anything else and is uploaded. If the data has a low priority it can be sent at a low bit rate so as not to interfere with the experience of the user of mobile device 16 or anything the user might be doing. For example, low priority data may be "trickled up" or uploaded at 10 Kbps.

If the uploading of data from a mobile router 112 or vehicle 101 is interrupted for any reason the session, such as, for example, by loss of communications via a wireless wide area network communication link 122, mobile router 112 or processor 440 will restore the uploading of data where the uploading had left off, when a communication link is again established to communication server 133.

In various embodiments, the number of mobile routers 112 may be very large, and may number millions of mobile routers 112 or other mobile devices. To efficiently provide an arrangement for tracking/monitoring the number of routers, a distributed network arrangement and method is provided for providing communication to the routers. More specifically, to support the ability of the system to scale up back-end systems that support mobile devices in vehicles that number from a few thousand to millions, we developed a method and architecture that allows for easy addition of capacity as the networked number of mobile routers increases.

Every mobile router 112 is configured to communicate with a communication server for uploading of data and for downloading content.

Figure 6:
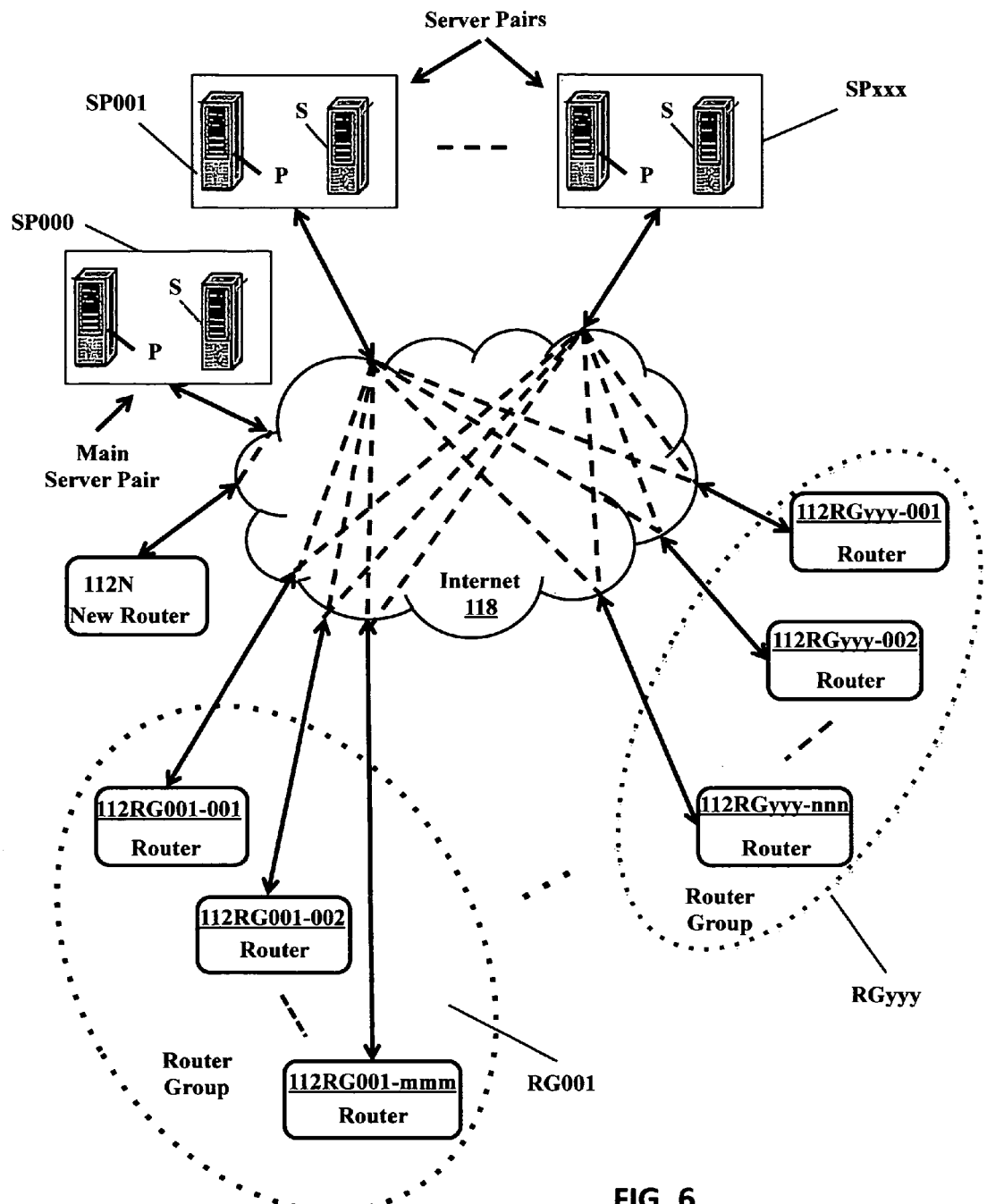
FIG. 6 illustrates details of an expandable router network.

Mobile router 112 comprises an interface 444 to a wireless communications link; a memory 442 storing information comprising configuration information 407; a memory 508 storing main server information utilizable to identify a main network server; and a communications agent 513 operable with the interface 444 to establish communication via the wireless communications link 122 to a network 600 shown in FIG. 6 comprising a main server SP000 and a plurality of group servers SP001 ... SPxxx. Network 600 is an expanded version of network 100 shown in FIGS. 1, 2, and 3. Communications agent 513 is operable such that its initial communication to network 600 utilizes the main server information stored in memory 508 to establish a first communication with main server SP000. Mobile router 112 further comprises processor or microprocessor 440 operable with communications agent 513 to interact with main server SP000 to upload the configuration information from memory 407 to main server SP000 via network 600 shown in FIG. 6.

Communications agent 513 is operable to receive group server identification information from main server SP000 when communicating with main server SP000 a second time. Microprocessor 440 is operable to store the group server identification information in memory 508. The group server information comprises information identifying one or more servers corresponding with a predetermined group assigned by main server SP000. Communications agent 513 utilizes the group server identification information for subsequent communication via network 600.

The group server identification information is received by communications agent 513 from main server SP000 the second time mobile router 112 establishes communication with main server SP000. Communications agent 513 utilizes the group server identification information to access one group server of the plurality of group servers SP001, ..., SPxxx.

The group server identification information comprises identification information for a predetermined number of group servers selectively assigned from the plurality of group servers SP001, ..., SPxxx.

Turning back to FIG. 5, microprocessor 440 is operable to select a group server from the predetermined number of group servers with which to communicate via network 600. Microprocessor 440 selects the group server from the predetermined number of group servers in accordance with a predetermined selection algorithm. In one embodiment, the group server is selected by accessing the first available group server by attempting to access the group servers in sequential order as stored in memory 508.

Although the above description refers to each server in the singular, in an embodiment of the invention, each group server SP001, ..., SPXXX shown in FIG. 6 comprises a corresponding pair of servers P, S that are identically configured.

One group server P, S of each group server pair operates as a primary server P to track and monitor the plurality of mobile routers and the corresponding paired server is selected as a backup secondary server S. Each primary group server P and its corresponding secondary server S operate such that data in primary group server P is replicated into its corresponding secondary server S.

Primary group server P and the secondary server S operate to determine if a failure occurs in the primary group server; and the primary group server P and the secondary server S operate to automatically switch to the secondary server as primary group server upon occurrence of a failure. After the original primary group server P is repaired, it is manually switched back in service.

The group server pairs SP001, ..., SPxxx are dispersed to be located at dispersed geographic locations and have different network peering points.

When a new mobile router 112N is provisioned at the factory, it is configured to talk to the "main" communications server pair SP000 at the network operations center 141 shown in FIG. 1 by storing access information for "main" communications server pair SP000 in memory 508. Each newly provisioned mobile router 112N registers with the "main" communications server pair SP000 and uploads its configuration information to "main" communications server pair SP000. When mobile router 112N registers with the "main" communications server pair SP000 it calls into an "unassigned" server group address by default.

When mobile router 112N is sold and shipped it is assigned to a group selected from a plurality of groups RG001-RGyyy. The group to which a mobile router 112 is assigned is usually customer specific. Non-limiting examples of such customers to which a mobile router is assigned include automotive companies, e.g., Chrysler, or electronics retailers, e.g., Best Buy.

The next time mobile router 112N comes on line and talks to main communications server pair SP000, main communications server pair SP000 will identify that mobile router 112N has been assigned to a group selected from the groups RG001 through RGyyy that is different from the "unassigned" group. Main communications server pair SP000 will then reassign mobile router 112N to talk to a new communications server pair that handles the group to which mobile router 112N has been assigned by downloading the new communication server pair access information to memory 508. The new communications server pair is selected from the communications server pairs SP001 through SPxxx There can be multiple communications server pairs per group and each communications server can support multiple groups.

Each mobile router 112 is configured by the main communications server pair SP000 with addresses for multiple communications server pairs. The addresses for the multiple communication server pairs are stored in mobile router 112 memory 508 shown in FIG. 5. Memory 508 may be an assigned portion of memory 442 as shown or may be a separate memory. Each mobile router 112 will access the server addresses stored in its corresponding memory 508 in a predetermined order. If a communication server pair associated with a first address is unavailable, mobile router 112 will access the next address of a communications server stored in memory 508. Mobile router 112 will access communications server addresses from memory 508 in predetermined order until communications with a corresponding communications server is established.

Figure 7:
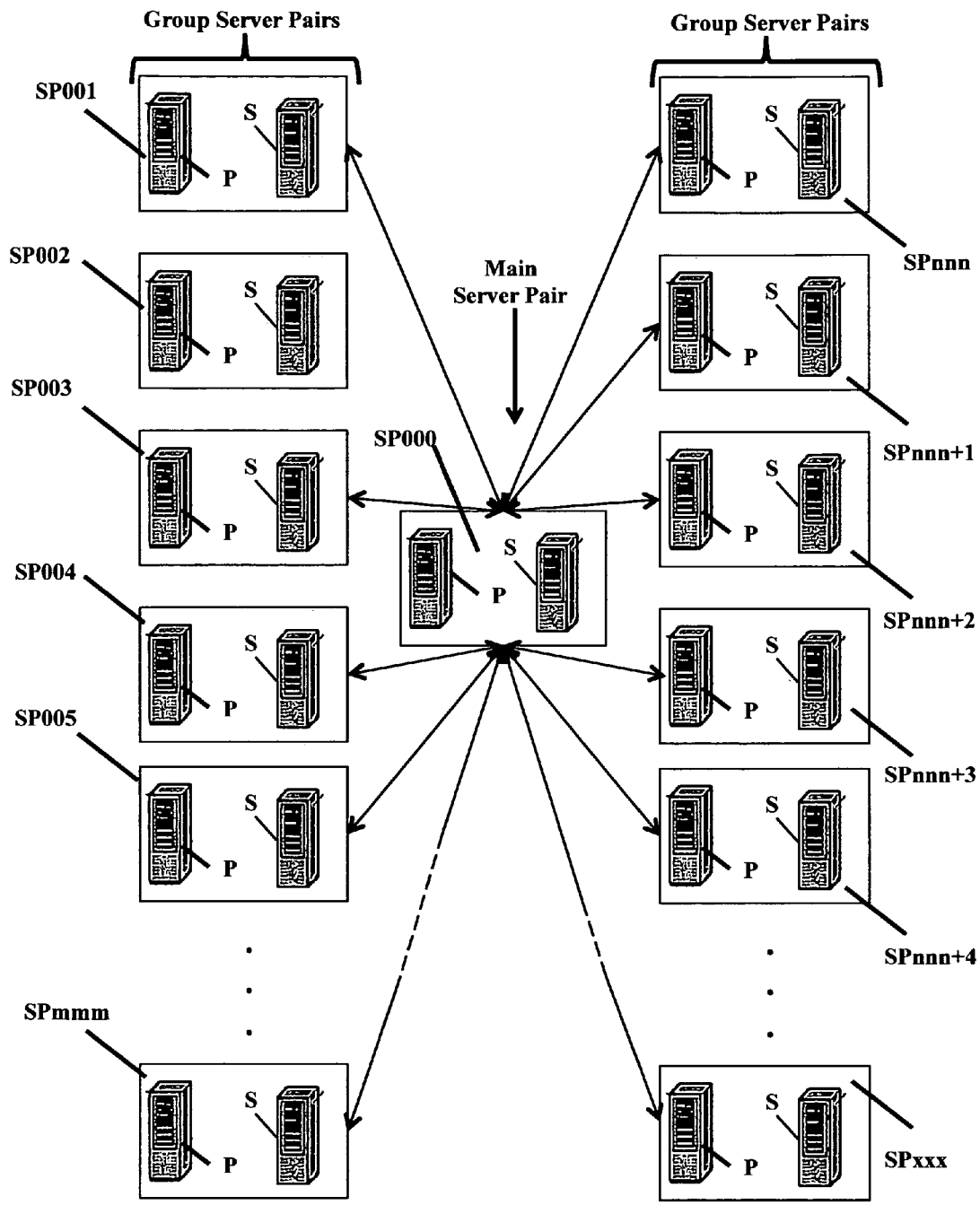
FIG. 7 illustrates further details of the network of FIG. 6.

Main server pair SP000 includes a manager program. The manager program is provided so that main server pair SP000 may communicate to all of communications servers SP001-SPXXX, so an operator of the network system never needs to know which communications server communicates with which router. The communication by main server pair SP000 to server pairs SP001-SPXXX is illustrated in FIG. 7.

Communications server pairs SP001-SPXXX do not need to be located in the same facility. It is preferable that the communications server pairs SP001-SPXXX are not in the same facility. It is highly preferable that the communications server pairs SP001-SPxxx are geographically disperse and have different network peering points.

With the server network architecture described above, added capacity is easily added by simply adding additional server pairs and configuring them as available within the system manager at the network operations center SP000.

As pointed out above, cellular carriers or service providers typically charge for data usage by a customer on the basis of the amount of data bytes uploaded and downloaded to the customer device. Frequently there may be discrepancies between the carrier's or service provider's reported data usage and the actual data usage. Generally the discrepancies are in the carrier's favor.

Cellular carriers or service providers typically require that discrepancies be reported within a predetermined fixed time period, e.g., 30 days, of the bill.

Turning back to FIG. 5, mobile router 112 utilizes processor 440 to collect cellular network usage or statistical data by counting data bytes received and transmitted via WAN interface 444.

Figure 8:
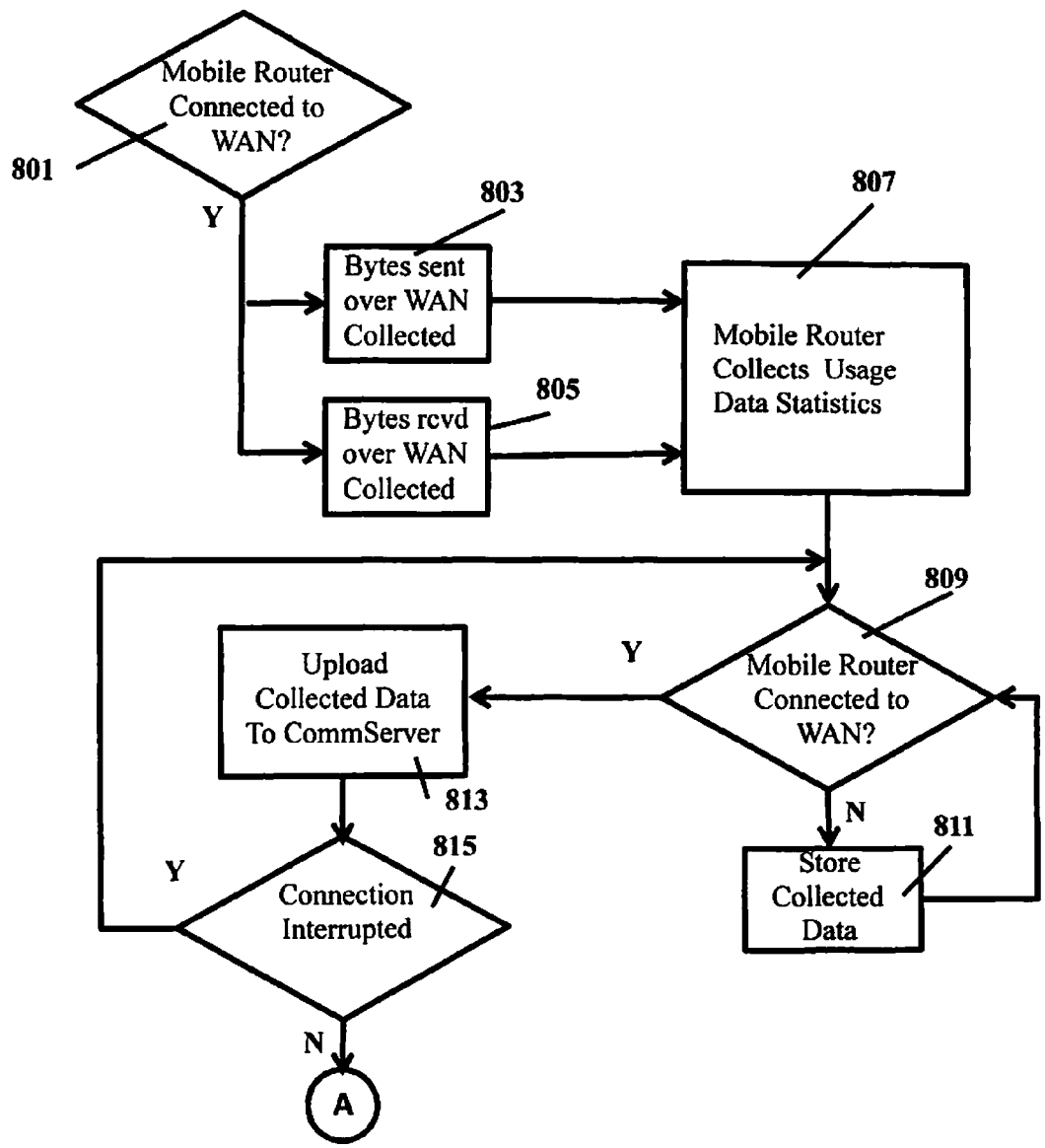
FIG. 8 illustrates method steps.

Turning now to FIG. 8, mobile router 112, determines whether or not WAN interface 444 is coupled to cellular network 120 at step 801. If router 112 is coupled to cellular network 120, mobile router 120 monitors the data bytes sent out over cellular network 120 between mobile device 116 and a destination device at step 103, and monitors the data bytes received over cellular network 120 at step 805. Mobile router 112 collects statistical usage data at step 807.

Subsequent to collection of statistical usage data, mobile router 112 determines at step 809 whether there is an active connection to cellular network 120. If there is no connection to cellular network 120, processor 440 stores the usage or statistical data in memory 595 as shown in FIG. 5. Processor 440 records the numbers of bytes sent separately from the number of bytes received.

At step 813, mobile router 112 automatically uploads the usage or statistical data on a predetermined periodic basis to communications server 133 at network operations center 141 shown in FIG. 1. The uploading is accomplished by the cooperative operation of processor 440 and WAN interface 444. Processor 440 monitors the uploading and determines if the connection via cellular network 120 to network operations center 141 is interrupted at step 815. The next time a connection is established to network operations center 141, processor 440 re-initiates uploading of the statistical or usage data.

Figure 9:
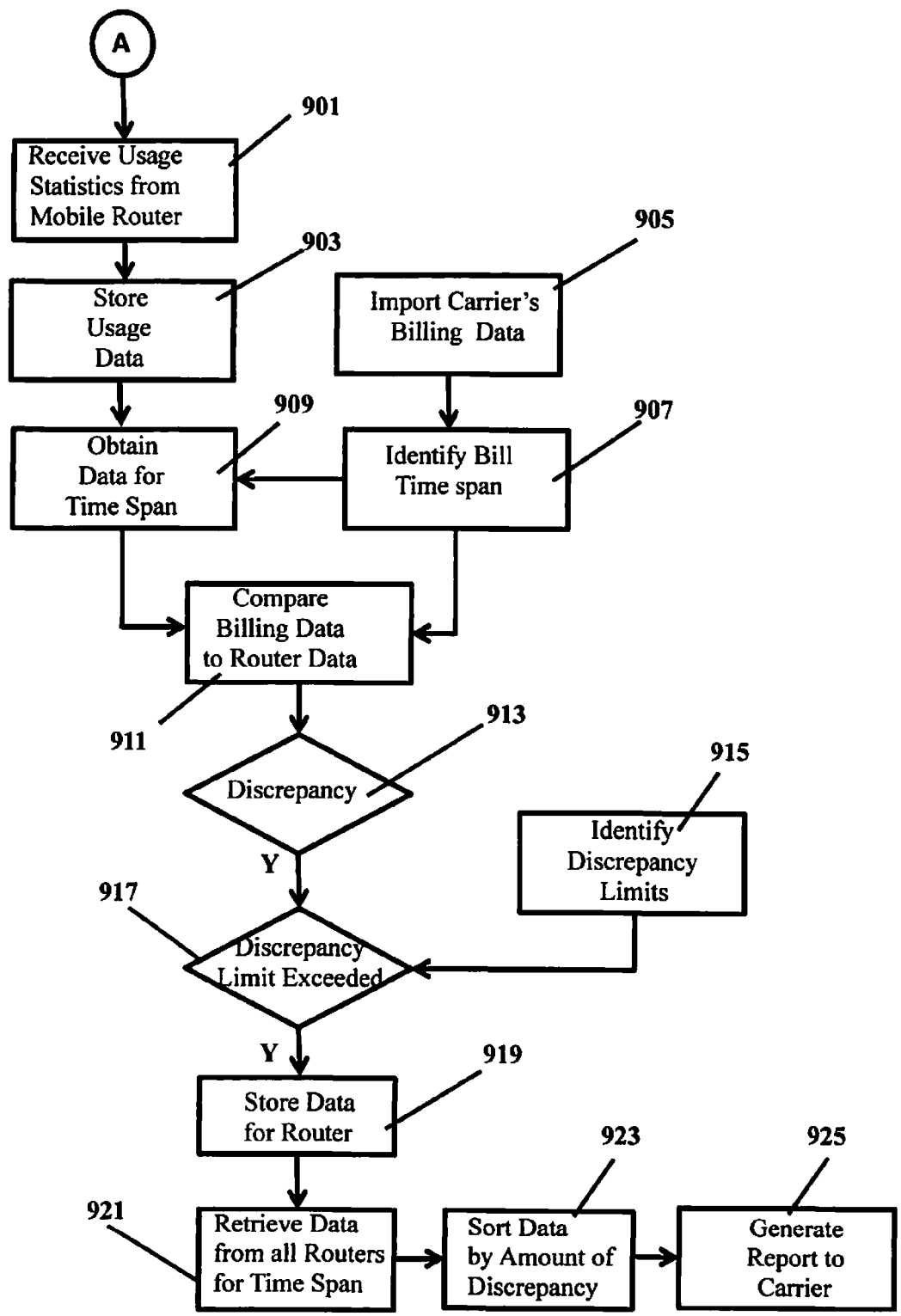
FIG. 9 illustrates method steps.

Turning now to FIG. 9 in conjunction with FIG. 1, the operation at network operations center 141 is described. The uploaded statistical or usage data from each mobile router 112 is received at step 901. The uploaded usage or statistical data is stored in database 143 at step 903.

Network operations center 141 comprises a report manager 171. Report manager 171 can import a bill from a carrier or service provider, e.g., Sprint or Verizon in a predetermined format. By way of non-limiting example, the predetermined format may be a concurrent versions system (cvs) format. Report manager 171 can import the carrier bill via a connection utilizing the Internet 118 or any other connection of a type that is typically used to access data. In various embodiments, report manager can be a server with a software program that provides the functionality to the operation of the server, or it can be a processor that is operated under program control of a report manager program. In addition, the server comprising the report manager 171 may further comprise a communications manager that operates in cooperation with the report manager. In various embodiments the communications manager 133 operating in conjunction with one processor may be considered to be a first apparatus and the report manager 171 operating in conjunction with the same or a different processor may be considered as a second apparatus.

At step 905 report manager 171 imports the carrier or service provider's billing data from billing center 167 shown in FIG. 1.

At step 907, report manager 171 determines the time span of the carrier's bill, e.g., March 1 through March 31.

At step 909, report manager 171 obtains the usage data for mobile routers 112 for the same time span covered by the carrier's bill.

At step 911, report manager 171 compares the carrier reported usage and the actual usage for each router for the time span of interest in order to identify discrepancies. There will always be some amount of discrepancy due to carrier's delay in posting usage for mobile routers 112 that are roaming.

At step 913, report manager 171 identifies discrepancies between the billing data and the usage data for each mobile router 112.

At step 915, report manager 171 identifies discrepancy limits that are applicable to the billing data. The discrepancy limit or limits are stored in memory.

At step 917, report manager 171, utilizing the discrepancy limits, identifies the discrepancies for each mobile router 112 that are exceeded.

At step 919, report manager 171, stores the discrepancy data exceeding the discrepancy limit for each mobile router 112.

At step 921, report manager 171 retrieves the discrepancy data for all mobile routers 112 for the applicable time span, sorts the discrepancy data by the amount of discrepancy at step 923, and at step 925 generates a discrepancy report. The report is automatically run and sorted by discrepancy amount each billing cycle. The report may be automatically loaded to the carrier.

Mobile router 112 in FIG. 5 comprises: a wide area network wireless interface 444 operable to access a cellular network 120 shown in FIG. 1; first apparatus 513 operable to upload data and to download data via the interface to the cellular network; second apparatus 440 operable to monitor the uploaded data and the downloaded data and to generate usage data corresponding to predetermined quantifiable units corresponding to the uploaded data and the downloaded data; and the first apparatus 513 and second apparatus 440 cooperatively operate to automatically upload the usage data to a server 133 shown in FIG. 1 for generation of usage discrepancy reports.

First apparatus 513 and second apparatus 440 cooperatively operate to automatically upload the usage data to server 133 in accordance with a predetermined schedule; and the first apparatus 513 uploads the usage data to server 133 via cellular network 120.

In accordance with another aspect of mobile router 112, first apparatus 513 and second apparatus 440 are cooperatively operable such that if, during upload of usage data to server 133, the upload is interrupted, the usage data is uploaded at a subsequent time.

Another aspect of mobile router 112 comprises: wide area network wireless interface 444 to access cellular network 120 provided by a predetermined cellular service provider; a local area network wireless interface 446 for wireless connection to a mobile device 116; first apparatus 513 operable to upload data from mobile device 116 and to download data to mobile device 116 via interface 444 and cellular network 120; second apparatus 440 operable to monitor the uploaded data and the downloaded data and to generate corresponding usage data; and first apparatus 513 and second apparatus 440 cooperatively operate to automatically upload the usage data to server 133.

A further aspect of mobile router 112 is that it may comprise: a wide area network wireless interface 444 operable to access cellular network 120, usage of cellular network 120 is billed based upon data usage; a communications agent 513 operable to upload data and to download data to cellular network 120 via interface 444; a processor 440 operable to monitor the uploaded data and the downloaded data and to generate usage data corresponding to predetermined quantifiable units corresponding to the uploaded data and the downloaded data; and communications agent 513 and processor 440 cooperatively operate to automatically upload the usage data to communications manager/server 133 for generation of usage discrepancy reports.

Network operations center 141 shown in detail in FIG. 1 is operable with a network 100 comprising a plurality of wireless mobile routers 112. Each mobile router 112 shown in FIGS. 4 and 5 comprises a wide area network wireless interface 144, 444 to access a cellular network 120 provided by a predetermined cellular service provider. Each mobile router 112 is operable to upload data and to download data via cellular network 120. Each mobile router 112 is operable to monitor the uploaded data and the downloaded data and to generate usage data of a type that the corresponding cellular service provider utilizes to bill for usage of the cellular network 120. Network operations center 141 comprises: first apparatus 133 operable to manage communications with the plurality of mobile routers 112, operable to receive the usage data, and operable to access billing data from the predetermined cellular service provider for each of the mobile router 112 from cell network service provider billing center 167 shown in FIG. 1; and second apparatus 171 operable to compare the usage data for each mobile router 112 to corresponding billing data to determine if there is a billing discrepancy.

In one embodiment, network operations center 141 further comprises: a stored predetermined discrepancy limit 197. Second apparatus 171 is operable to determine if any of the billing discrepancies exceed the predetermined limit. Second apparatus 171 is operable to automatically generate a discrepancy report to the service provider based on the billing discrepancies.

In one embodiment, first apparatus 133 and second apparatus 171 are cooperatively operable to automatically provide the report to the service provider.

In one embodiment second apparatus 171 is operable to sort the billing discrepancies by the amount of discrepancy and generate a report based on the billing discrepancies, and automatically provide the report to the service provider.

A network server 297 is provided in one embodiment shown in FIG. 2. Network server 297 is operable with a plurality of wireless mobile routers 112. Each mobile router 112 comprises a wide area network wireless interface 444 to access a cellular network 120 provided by a carrier as shown in FIG. 4. Turning back to FIG. 2 each mobile router 112 is operable to upload data and to download data via cellular network 120. Each mobile router 120 is operable to monitor the uploaded data and the downloaded data and to generate statistical or usage data in quantifiable units of a type that the corresponding carrier or service provider utilizes to bill for usage of the cellular network 120. Network server 297 comprises: a communications manager 133 operable to manage communications with the plurality of mobile routers 112, operable to receive the statistical or usage data and operable to access billing data from the predetermined carrier for each of the mobile routers 112; and a processor 299 operable to compare the statistical or usage data for each said wireless mobile router to corresponding billing data to determine if there is a billing discrepancy.

In an embodiment, network server 297 may comprise a stored predetermined discrepancy limit 197. Processor 299 is operable to determine if any of the billing discrepancies exceed the predetermined limit and is operable to automatically generate a discrepancy report to the carrier based on said billing discrepancies.

In an embodiment, communications manager 133 and processor 299 are cooperatively operable to automatically provide the discrepancy report to the carrier.

In one embodiment, processor 133 is operable to sort the billing discrepancies by the amount of discrepancy.

In the various embodiments, the billing data is for a predetermined billing period.

In one embodiment, a method of operating a network server 297 for a network 100 comprising a plurality of wireless mobile routers 112 is provided. Each mobile router 112 comprises a wide area network wireless interface 444 to access a cellular network 120 provided by a predetermined cellular carrier or service provider. Each mobile router 112 is operable to upload data and to download data via cellular network 120 and is operable to monitor the uploaded data and the downloaded data and to generate statistical data in quantifiable units of a type that the corresponding cellular carrier utilizes to bill for usage of cellular network 120. The method comprises: selectively coupling server 297 to the plurality of mobile routers 112 via the cellular network 120; operating server 297 to access billing data from the predetermined carrier for each of the mobile routers 112; receiving from each of the mobile routers 112 the corresponding statistical data; comparing the statistical data for each mobile router 112 to corresponding billing data for each mobile router 112 to determine if there is a billing discrepancy.

The method further comprises determining if the billing discrepancy exceeds a predetermined limit 197.

In accordance with one aspect of the embodiment, the method comprises automatically generating a discrepancy report to the carrier or service provider.

In accordance with yet another aspect of the embodiment, the method comprises receiving the statistical data from each mobile router 112 in accordance with a predetermined schedule. The method further may comprise server 297 receiving the statistical data via cellular network 120.

In accordance with still yet a further aspect of the embodiment, the method may comprise one or more of the following steps of: storing a predetermined discrepancy limit 197; determining if the billing discrepancies for any mobile router 112 exceeds the predetermined limit 197; storing the billing discrepancies for each mobile router 112; generating a report based on the billing discrepancies; and automatically providing the report to the carrier.

The method embodiment may comprise the steps of sorting the billing discrepancies by the amount of discrepancy; and generating a report based on the billing discrepancies; and automatically providing the report to the carrier.

In accordance with various embodiments, the billing data is for a predetermined billing period.

In one embodiment, a network 100, comprises: a plurality of wireless mobile routers 112, each comprising a wide area network wireless interface 444 to access a cellular network 120 provided by a predetermined cellular carrier. Each mobile router 112 is operable to upload data and to download data via the cellular network 120. Each mobile router 112 is operable to monitor the uploaded data and the downloaded data and to generate statistical data in quantifiable units of a type that the corresponding cellular carrier utilizes to bill for usage of the carrier's cellular network. The network 100 further comprises a server 297 coupleable to the plurality of wireless mobile routers 112 via the cellular network 120. Server 297 is operable to access billing data from the predetermined carrier for each of the mobile routers 112. Each mobile router 112 automatically operates to upload the statistical data to the server 297. Server 297 operates to compare the statistical data for each mobile router 112 to corresponding billing data for each mobile router 112 to determine if there is a billing discrepancy.

Server 297 may operate to determine if the billing discrepancy exceeds a predetermined limit 197. Server 297 may be operable to automatically generate a discrepancy report to the carrier.

In one network embodiment, each mobile router 112 uploads the statistical data to server 297 in accordance with a predetermined schedule and via cellular network 120.

In an embodiment of network 100, mobile router 112 is operable such that if, during an upload of the statistical data to server 297, the upload is interrupted, mobile router 112 retains the statistical data, and uploads the statistical data during a subsequent time that mobile router 112 has a communications link to server 297.

In a network embodiment, server 297 comprises a stored predetermined discrepancy limit 197. Server 297 operates to determine if the billing discrepancies for any of the mobile routers 112 exceeds the predetermined limit. Server 297 may be operable to store the billing discrepancies for each mobile router 112 in memory, e.g. database 143. Server 297 is operable to generate a report based on the billing discrepancies. Server 297 automatically provides the report to the carrier. Server 297 may be operable to sort the billing discrepancies by the amount of discrepancy.

It will be appreciated by those skilled in the art that various changes and modifications may be made to the embodiments described herein without departing from the spirit or scope of the invention. It is intended that the invention not be limited in any way by the embodiments shown and described herein, but that the invention be limited only by the claims appended hereto.

What is claimed is:

1. A method of operating a network server, for a network comprising a plurality of wireless mobile routers, each of said mobile routers comprising a wide area network wireless interface to access a cellular network provided by a predetermined cellular carrier provider, each of said mobile routers comprising a wireless local area network, each said mobile router operable to upload data and to download data via said cellular network, each said mobile router is operable to monitor said uploaded data and said downloaded data and to generate usage data in quantifiable units of a type that the service provider utilizes to bill for usage of said cellular network, said method comprising:
selectively coupling said server to said plurality of mobile routers via said cellular network;
operating said server to access billing data from said predetermined service provider for each of said mobile routers;
receiving from each of said mobile routers corresponding said usage data;
comparing said usage data for each said mobile router to corresponding billing data to determine if there is a billing discrepancy for each said mobile router.

2. A method in accordance with claim 1, comprising:
determining if said billing discrepancy exceeds a predetermined limit.

3. A method in accordance with claim 2, comprising:
automatically generating a discrepancy report to said service provider.

4. A method in accordance with claim 1, comprising:
receiving said usage data from each said mobile router in accordance with a predetermined schedule.

5. A method in accordance with claim 4, wherein:
receiving said usage data via said cellular network.

6. A method in accordance with claim 1, comprising:
storing a predetermined discrepancy limit.

7. A method in accordance with claim 6, comprising:
determining if each said billing discrepancy for each corresponding said mobile router exceeds said predetermined limit.

8. A method in accordance with claim 7, comprising:
storing billing discrepancies for all of said plurality of mobile routers.

9. A method in accordance with claim 8, comprising:
generating a report based on said billing discrepancies.

10. A method in accordance with claim 9, comprising:
automatically providing said report to said service provider.

11. A method in accordance with claim 8, comprising:
sorting said billing discrepancies by the amount of discrepancy.

12. A method in accordance with claim 11, comprising:
generating a report based on said billing discrepancies.

13. A method in accordance with claim 12, comprising:
automatically providing said report to said service provider.

14. A method in accordance with claim 1, wherein:
said billing data is for a predetermined billing period.

15. A method in accordance with claim 14, comprising:
providing said server with a stored predetermined discrepancy limit.

16. A method in accordance with claim 15, comprising:
determining if said billing discrepancy for said billing period for each said mobile router exceeds said predetermined limit.

17. A method in accordance with claim 16, comprising:
storing said billing discrepancy for each said mobile router.

18. A method in accordance with claim 17, comprising:
generating a report for said billing period based on all billing discrepancies corresponding to said plurality of mobile routers.

19. A method in accordance with claim 18, comprising:
automatically providing said report to said service provider.

20. A method in accordance with claim 17, comprising:
sorting said billing discrepancies by the amount of discrepancy.

21. A method in accordance with claim 20, comprising:
generate a report based on said sorted billing discrepancies.

22. A method in accordance with claim 21, comprising:
automatically providing said report to said service provider.

* * * * *